April 13, 1943. H. E. KALTER 2,316,436
CYCLE SADDLE POST
Filed April 3, 1941

INVENTOR.
Harold E. Kalter
BY
Frank M. Slough
HIS ATTORNEY

Patented Apr. 13, 1943

2,316,436

UNITED STATES PATENT OFFICE 2,316,436

CYCLE SADDLE POST

Harold E. Kalter, Elyria, Ohio, assignor to The Troxel Manufacturing Company, Elyria, Ohio, a corporation of Ohio Application April 3, 1941, Serial No. 386,596

2 Claims. (Cl. 287—14)

My invention relates to cycle saddle assemblies and relates more particularly to an improved construction for securing a saddle, such as a bicycle or a motor cycle saddle to the saddle post of such vehicles.

In my prior patent, No. 2,205,014, patented June 18, 1940, I disclosed an improved type of cycle saddle assembly accomplishing the same general result as sought for herein, such prior patented construction involving the use of the saddle post, preferably in the form of a round steel bar which was bent or curved at its upper end to provide an eye, said eye adapted to be associated with two substantially parallel spaced reach members, the confronting surfaces of said reach members and the eye being indentured, whereby upon the projection of bolt means through perforations provided in said reach members aligned with the eye of said post and the tightening of said bolt means, a secure clamping connection was afforded between the post and reach assembly.

I now find that although the above recited structure is advantageous under certain conditions that it is not readily adaptable for all purposes, and since further difficulty is providing such eye for a saddle post in an inexpensive manner that such structure does not fulfill all the desired situations.

My present invention dispenses with the provision of an upper integral eye for such saddle post and assures greater adaptability in manufacture in supplying saddle posts of different diameters for different cycles manufactured by cycle manufacturers for whose use the saddle and post assembly is provided.

It is therefore an object of my invention to provide an improved cycle saddle and post connecting means.

Another object of my invention is to provide such improved structure as can be conveniently and inexpensively made and which will be more efficient in performing the functions required of it than the structure of my prior patent and other prior patents with which I am familiar.

Another object of my invention is to provide an improved securing means for cycle saddles and saddle posts wherein the connections required for separate clamping elements utilized between the saddle post and saddle reach members are dispensed with, whereby the saddle can be directly mounted on the post.

Other objects of my invention and the invention itself will become more readily apparent by reference to the drawing forming a part of this specification, in which drawing.

Figures 1, 2, 3, 4, 5, 6:
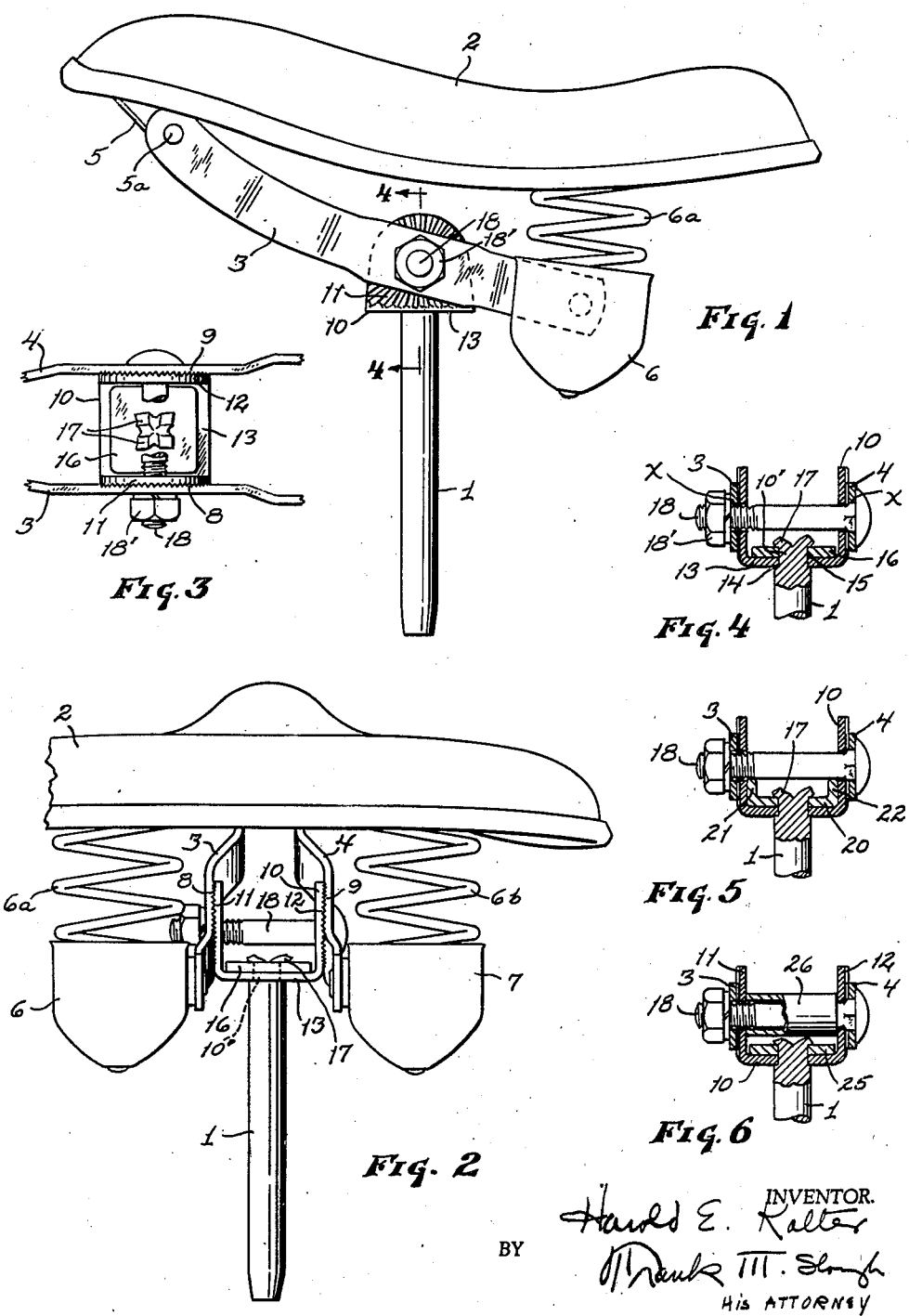
Fig. 1 is a side elevational view of the improved post and saddle securing means of my invention.
Fig. 2 is a rear elevational view of the structure of Fig. 1.
Fig. 3 is a fragmentary plan view of the clamping means of Fig. 1 showing the upper portions of the post projected therethrough.
Fig. 4 is a vertical cross-sectional view of the post and clamp member of Fig. 3 taken on the line 4—4 of Fig. 1.
Fig. 5 is a view similar to that of Fig. 4 but showing an embodiment of my invention.
Fig. 6 is a view similar to that of Figs. 4 and 5, but illustrating a further embodiment of my invention.

Referring now to the drawing in which like parts are designated by like reference characters, at 2, I show a cycle saddle seat of any desired construction supported on reach members 3 and 4 disposed below the seat, said reach members carrying at their rear extremities, substantially cup-shaped spring supporting elements 6 and 7 respectively. Springs 6—a and 6—b of any conventional form interconnect the cups on the rear end of the reach members to the cycle seat, being secured thereto in a convenient manner. The reach members 3 and 4 are preferably connected together at their forward ends, as by a rivet 5—a, and are interlinked with the forward or pommel end of the saddle, as by a link 5 or other suitable connector.

The precise construction of the cycle seat, reach members and the interconnecting springs or other connector between the reach member and the seat may be of any conventional form, but with respect to the present invention, the reach members should have substantially roughened relatively confronting surfaces at their intermediate portions, where the post 1 is adapted to be adjustably connected to the reach members.

In the embodiment illustrated, the reach members are each formed of a flattened steel strip and in the post connecting intermediate portion of their lengths, the opposite confronting faces of the reach members are substantially parallel and are roughened or indentured, as illustrated at 8 and 9 to produce alternate ridges and grooves, preferably radiating from a central aperture $x$, the apertures of the two reach members being horizontally aligned to permit a bolt 18 to pass therethrough as later described.

The stem of the cycle post 1 is of any conventional form and, in the embodiment illustrated, is shown as being of round bar stock. To effect the connection between the reach members and the cycle saddle post, on the upper end of the post there is rigidly mounted a channel-shaped sheet metal stamping 10, having a horizontal web 13, and upstanding flanges 11 and 12, the flanges each being perforated with the perforations in horizontal alignment with each other. The outer surfaces of the flanges of the channel-shaped stamping 10 are suitably roughened, preferably by providing radially extending serrations, radiating from the bolt receiving aperture in the manner similar to the radial serrations previously described as being provided on the confronting opposing surfaces of the two reach members. The stem of the saddle post 1 is rigidly secured to the web 13 of the channelled stamping in any suitable manner, but preferably by projecting a reduced end 10' of the post 1 through aligned apertures of the stamping web 13, with a reinforcing washer 16 superposed over the web, and then heading over the reduced end of the post in a riveting operation, as shown at 17.

With the parts arranged, as illustrated in the drawing, the bolt 18 is horizontally projected through the aligned apertures of the reach members and the stamping flanges, as shown, and the nut shown at 18' is then turned tightly on the threaded end of the bolt to tightly compress inwardly the relatively resilient reach members 3 and 4 into compressive tight clamping engagement with the outer faces of the channel stamping flanges. In so clamping the reach members and stamping flanges together, the ridges of the one element are meshed into depressions of the other element, so that there is a locking meshing fit between each of the engaged surfaces of channel-shaped stamping flanges and the contacted similarly roughened surface of the clamping inner surface of the corresponding reach member.

It will be understood that before tightening the nut 18' to effect tight clamping locking engagement, the front end of the cycle saddle seat may be tilted downward or raised upwardly with respect to the rear end of the saddle to accomplish the seat tilting adjustment desired and then the tightening of the nut on the bolt will rigidly lock the reach members to the cycle post in a given desired adjusted relatively angular relationship, such, for instance, as illustrated in Fig. 1.

Subsequently, this adjustment can be altered as desired by loosening the nut, changing the inclination of the saddle and then retightening the nut.

As stated hereinbefore, Figs. 5 and 6 represent further embodiments of my invention;

In Fig. 5 the post and clamping members are of similar construction to that of the embodiment illustrated in Figs. 1–4, inclusive, but the washer element 15 of the foregoing figures in the embodiment of Fig. 5, as illustrated at 20, is provided with a pair of upstanding flanges 21 and 22, which terminate immediately adjacent the aligned perforations of the upwardly extending flanges of the clamp member and the reach members, whereby when the bolt 18 is projected through said clamp and reach members, the upper terminus of the flanges 21 and 22 of the washer element 20 will tightly engage the stem of said bolt means. The element 20 is therefore substantially channel-shaped and is nested within the channel-shaped member 10, and reinforces the flanges of said channel member against the inward compressive stress occasioned by the tightening of the nut on the bolt 18, when the post and saddle are joined together with the serrations on the reach members and on the outer surfaces of the channel member flanges in meshing engagement;

In Fig. 6 the washer element 25 and the post is of similar construction to that best illustrated in Fig. 4; the bolt means of such previously described structure is provided in this embodiment, however, with a cylindrical sleeve or bearing element 26, which is telescoped over the bolt and disposed between the said pairs of upwardly extending flanges 11 and 12 of said clamping member 10.

In this embodiment, the sleeve 25, being interposed between the flanges 11 and 12 of the member 10, prevents undue inward deflection of said flanges and when the nut on the bolt 18 is tightened up.

The cycle saddle mechanism of my invention, in any foregoing embodiments, provides a rigid detachable connection between the post 1 and the saddle by its reach members 3 and 4 in such manner that before tightening the nut on the clamping bolt 18, the saddle can be longitudinally tilted to suit the comfort and convenience of the user to such position that the angular relation between the post 1 and the reach member 3 can be widely varied. When the desired angular adjustment is achieved, tightening of the nut on the bolt rigidly retains the parts in their adjusted position with a minimum of most simple mechanical assembly operations.

I am aware that it has previously been proposed to directly roughen lateral surfaces of the upper portion of a cycle saddle post formed from a rod with its upper end bent to form a hook or eye, and then to interpose roughened lateral surfaces of the hook or eye between suitable roughened surfaces of cycle saddle reach members, but such a construction has been found to have the serious disadvantage that the forming of the eye or hook is a difficult expensive operation and is not adaptable to types of cycle saddles wherein the spacing between the reach members varies from the thickness of the metal of the bolt, eye or hook. Therefore, a manufacturer must keep in stock many sizes of cycle saddle posts, whereas, in the practice of the present invention, the expense incidental to bending a heavy steel rod and of suitably roughening its lateral surfaces is eliminated, a simple inexpensive stamping being substituted. In addition, these stampings made in various dimensions, serve as adaptors for use on the same kind of rods of the same sized stock to fit cycle saddles having reach members of widely varying dimensions, or varying spacing requirements.

Although I have illustrated in my invention in connection with the preferred embodiment thereof and have shown only a few departures therefrom, I am aware that my invention is susceptible to numerous and extensive departures from the embodiments herein illustrated and described without, however, departing from the spirit of my invention or the scope of the appended claims.

I claim:

1. In a cycle saddle, the combination with a pair of relatively spaced saddle seat supporting reach elements having substantially flat relatively confronting surfaces, said surfaces being indentured at a medial portion of their length and the said indentured surfaces being substantially centrally perforated, of a saddle post, a sheet metal clamp element of channel form having upstanding parallel flange and intermediate web portions, said web portion having a perforation disposed centrally thereof through which the upper end of said saddle post is adapted to project, said clamp element being rigidly secured to the upper end of said post and said flanges extending outwardly from the post, said flanges having their outer surfaces indentured in substantially the manner of said reach element surfaces and said flanges having aligned apertures through a centrally disposed portion of its indentured surface adapted to be placed in alignment with the apertures of said reach members, and a bolt projected through each said pair of apertures and adapted to resiliently compress the indentured surfaces of said reach members into meshing engagement with the indentured surfaces of the clamp element, whereby the saddle may be adjustably tilted to different desired angles and rigidly clamped to the desired adjusted position.

2. In a cycle saddle, the combination with a pair of relatively spaced saddle seat supporting reach members of a saddle post of substantially straight form, a sheet metal clamp of channel form having upstanding parallel flange portions and intermediate web portion, said web portion centrally apertured to receive an upper end of said post whereby said web portion is rigidly secured to the upper end of said post by peening the upper end of said post thereover, the upstanding flange portions extending longitudinally above the said post, said clamp and post constituting a unitary integrally united member, said unitary member being adapted to be projected between substantially flat relatively confronting surfaces of said reach members, said surfaces being indentured, and said indentured surfaces being substantially centrally perforated, the flanges of said unitary member having their outer surfaces indentured and centrally perforated, the perforations of said flanges and of the indentured surfaces of said reach element being aligned whereby bolt means associated therewith may be projected through each of said perforations and tightened to cause said unitary member and said reach elements to be in locked engagement with each other.

HAROLD E. KALTER.